United States Patent
Woo et al.

(10) Patent No.: US 7,307,553 B2
(45) Date of Patent: Dec. 11, 2007

(54) MPEG-4 ENCODING/DECODING METHOD, MEDIUM, AND SYSTEM

(75) Inventors: Sangoak Woo, Gyeonggi-do (KR);
Dokyoon Kim, Gyeonggi-do (KR);
Keechang Lee, Gyeonggi-do (KR);
Jeonghwan Ahn, Gyeonggi-do (KR);
Seyoon Tak, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/320,982

(22) Filed: Dec. 30, 2005

(65) Prior Publication Data
US 2006/0159261 A1   Jul. 20, 2006

(30) Foreign Application Priority Data
Dec. 31, 2004   (KR) .................... 10-2004-0117989

(51) Int. Cl.
*H03M 5/16* (2006.01)

(52) U.S. Cl. .......................... 341/57; 341/50

(58) Field of Classification Search ............ 341/50–90; 438/554, 558
See application file for complete search history.

(56) References Cited

U.S. PATENT DOCUMENTS

| | | | |
|---|---|---|---|
| 6,377,309 B1 * | 4/2002 | Ito et al. ..................... | 348/554 |
| 6,931,541 B1 * | 8/2005 | Nakagawa .................. | 713/193 |
| 6,959,115 B2 * | 10/2005 | Itokawa ..................... | 382/239 |
| 7,020,192 B1 * | 3/2006 | Yamaguchi et al. ........ | 375/240 |

* cited by examiner

*Primary Examiner*—Lam T. Mai
(74) *Attorney, Agent, or Firm*—Staas & Halsey LLP (57) ABSTRACT

An MPEG (Moving Picture Experts Group)-4 encoding/decoding method, medium, and system. The decoding method may include detecting information for identifying an array structure of binary data describing a scene, and decoding the binary data based on the detected information. Since, a conventional process of converting data into a binary file and an inverse transforming process, which require a copying operation, are not required, memory and power use can be reduced.

20 Claims, 6 Drawing Sheets

MPEG-4 ENCODING/DECODING METHOD, MEDIUM, AND SYSTEM

CROSS-REFERENCE TO RELATED APPLICATIONS

This application claims the priority benefit of Korean Patent Application No. 10-2004-0117989, filed on Dec. 31, 2004, in the Korean Intellectual Property Office, the disclosure of which is incorporated herein in its entirety by reference.

BACKGROUND OF THE INVENTION

1. Field of the Invention

Embodiments of the present invention, as discussed herein, relate to an MPEG (moving picture experts group)-4 encoding/decoding method, medium, and system, and more particularly, to an apparatus, medium, and method processing BIFS (Binary Format for Scenes) data.

2. Description of the Related Art

MPEG (Moving Picture Experts Group)-4 uses Binary Format for Scenes (BIFS) to describe the content of a scene. BIFS is a binary language based on VRML (Virtual Reality Modeling Language), which is a typical text-based language used to describe 3-dimensional (3D) graphic objects.

In a conventional MPEG-4 encoding system, VRML text data is parsed into binary data, the binary data is then converted into a binary file and the binary file is transmitted. In such a conventional MPEG-4 decoding system, the binary file can then be received and converted into binary data for reproduction.

More specifically, the conventional MPEG-4 encoding system converts the binary data, which may be stored in a memory, into a binary file such that the binary data can be individually identified, and the conventional MPEG-4 decoding system inversely transforms the binary file into the original binary data based on the individual identifications. However, at this time, the format conversion and inverse transformation require the use of a large capacity of memory and power.

SUMMARY OF THE INVENTION

Embodiments of the present invention provide an apparatus, medium, and method capable of reducing the amount of memory and power consumption required when encoding and/or decoding BIFS data.

To achieve the above and/or other aspects and advantages, embodiments of the present invention include a decoding method including detecting information for identifying an array structure of a continuous bit string of binary data describing a scene, and decoding the binary data based on the detected information.

The information may be an ID (identification) of a predetermined node among nodes making up the scene, and the detecting of information may include detecting the ID, separate from the binary data, for identifying the array structure for a set of fields within the binary data that define attributes of the predetermined node.

The decoding of the binary data may include decoding the binary data according to the array structure corresponding to the detected ID, among a plurality of array structures stored in a database.

The array structure and an array structure used in a corresponding encoding method, which generated the binary data, may be equivalent.

The binary data is BIFS (Binary Format for Scene) data based on MPEG (Moving Picture Experts Group)-4 standards based on VRML (Virtual Reality Modeling Language).

To achieve the above and/or other aspects and advantages, embodiments of the present invention include a decoding system including a detecting unit detecting information for identifying an array structure of a continuous bit string of binary data describing a scene, and a decoder decoding the binary data based on the information detected by the detecting unit.

The information may be an ID of a predetermined node among nodes making up the scene, and the detecting unit detects the ID, separate from the binary data, for identifying the array structure for a set of fields within the binary data that define attributes of the predetermined node.

The array structure and an array structure used in a corresponding encoding system, which generated the binary data, may be equivalent.

To achieve the above and/or other aspects and advantages, embodiments of the present invention include a medium including computer readable code to implement a decoding method, the method including detecting information for identifying an array structure of a continuous bit string of binary data describing a scene, and decoding the binary data based on the detected information.

To achieve the above and/or other aspects and advantages, embodiments of the present invention include an encoding method including generating information for identifying an array structure for a continuous bit string of binary data to describe a scene, and encoding the binary data according to the array structure corresponding to the information, wherein the encoding of the binary data includes accompanying the binary data with the information.

The information may be an ID of a predetermined node among nodes making up the scene, and the generating of the information may include generating the ID, separate from the binary data, for identifying a set of fields within the binary data that define attributes of the predetermined node.

The encoding of the binary data may include encoding the binary data according to the array structure corresponding to the information among a plurality of array structures stored in a database.

The array structure and an array structure used in a corresponding decoding method, for decoding the binary data, may be equivalent.

The binary data may further be BIFS data based on MPEG-4 standards based on VRML.

To achieve the above and/or other aspects and advantages, embodiments of the present invention include an encoding system including a generating unit to generate information for identifying an array structure for a continuous bit string of binary data to describe a scene, and an encoder to encode the binary data according to the array structure corresponding to the information, wherein the encoder accompanies the binary data with the information.

The information may be an ID of a predetermined node among nodes making up the scene, and the generating unit generates the ID, separate from the binary data, for identifying a set of fields within the binary data that define attributes of the predetermined node.

The array structure and an array structure used by a corresponding decoding system, for decoding the binary data, may be equivalent.

To achieve the above and/or other aspects and advantages, embodiments of the present invention include a medium including computer readable code to implement an encoding method, the method including generating information for identifying an array structure of for a continuous bit stream of binary data to describe a scene, and encoding the binary data according to the array structure corresponding to the information, wherein the encoding of the binary data includes accompanying the binary data with the information.

To achieve the above and/or other aspects and advantages, embodiments of the present invention include a decoding apparatus including a means for detecting information for identifying an array structure of a continuous bit string of binary data describing a scene, and a means for decoding the binary data based on the detected information.

To achieve the above and/or other aspects and advantages, embodiments of the present invention include an encoding apparatus including a means for generating information for identifying an array structure for a continuous bit string of binary data to describe a scene, and a means for encoding the binary data according to the array structure corresponding to the information, wherein the encoding of the binary data includes accompanying the binary data with the information.

To achieve the above and/or other aspects and advantages, embodiments of the present invention include an encoding method including generating information for identifying an array structure for a continuous bit string of binary data to describe a scene, and encoding the binary data according to the array structure corresponding to the information.

To achieve the above and/or other aspects and advantages, embodiments of the present invention include an encoding system including a generating unit to generate information for identifying an array structure for a continuous bit string of binary data to describe a scene, and an encoder to encode the binary data according to the array structure corresponding to the information.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
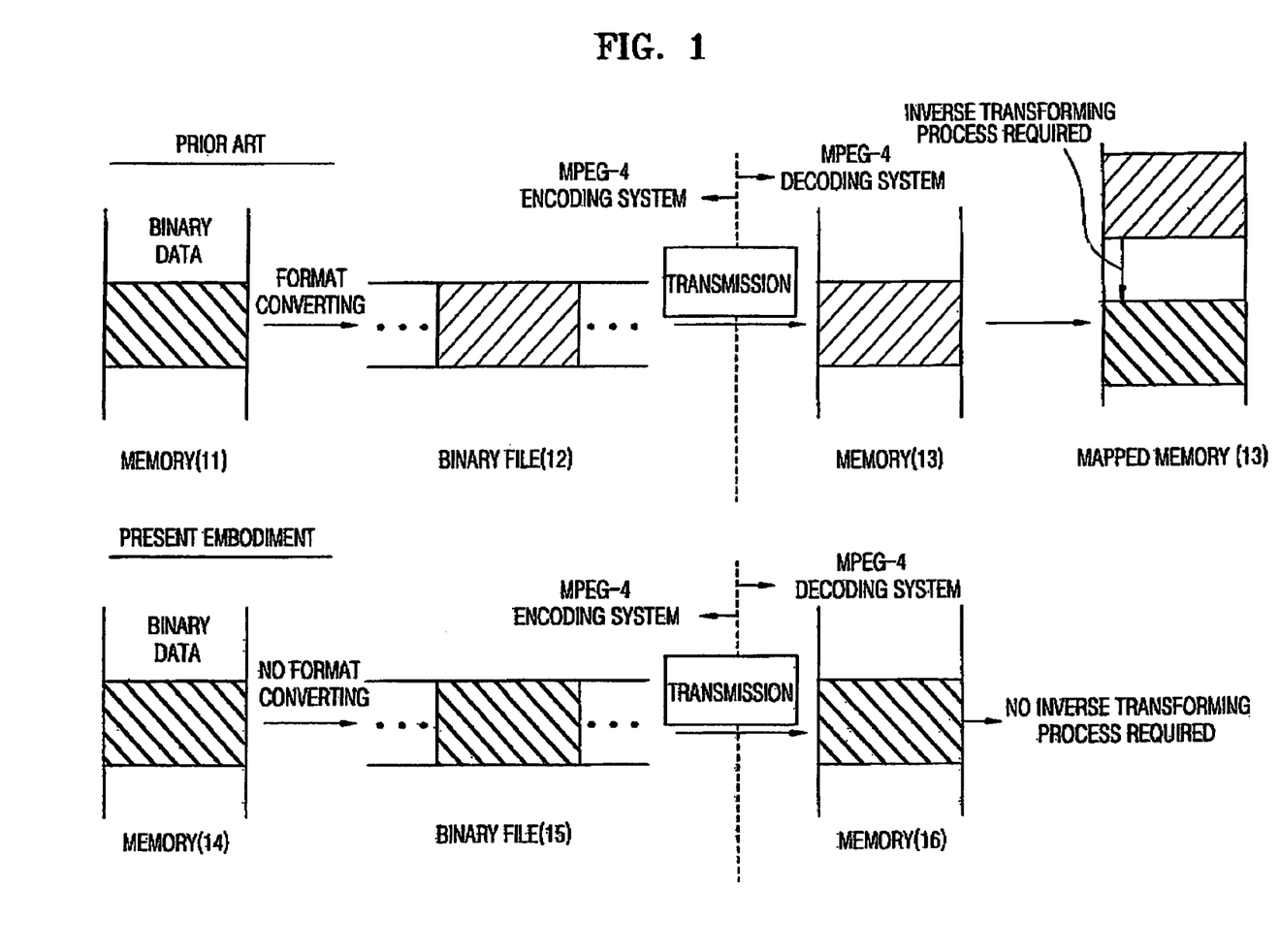
FIG. 1 illustrates a conventional storing of binary data and a storing of binary data according to an embodiment of the present invention.

FIG. 1 illustrates a conventional storing of binary data and a storing of binary data according to an embodiment of the present invention.

Referring to FIG. 1, a conventional MPEG (Moving Picture Experts Group)-4 encoding system converts binary data stored in a memory 11 into a binary file format, illustrated as binary file 12. If the binary data stored in the memory 11 is included in the binary file 12 without being converted, the binary file 12 would include a continuous bit string, and accordingly, the binary data included in the binary file 12 would not be identifiable. Therefore, the conventional MPEG-4 encoding system converts the binary data into a format in which the binary data can be identified. Further, the conventional MPEG-4 decoding system stores the binary file 12 in a memory 13, and inversely transforms the binary data stored in the memory 13 into original binary data format in mapped memory 13 with reference to mapping information. Therefore, here, the inverse transformation process requires a copy operation within memory 13, as shown in FIG. 1, thereby requiring large capacities of memory and power.

A MPEG-4 encoding system, according to an embodiment of the present invention, can convert binary data stored in a memory 14 into a binary file 15 without format conversion. Further, a MPEG-4 decoding system according to an embodiment of the present embodiment can store the binary file 15 in a memory 16. Since the format of the binary data stored in the memory 16 can be the same as the format of the original binary data, inverse transformation is not needed, compared with the need for such inverse transformation procedures in the conventional systems.

As described above, in the conventional MPEG-4 encoding system, VRML text data is parsed into the binary data and the binary data is converted into the binary file. Hereinafter, binary data, which can be a result of parsing VRML text data, will be referred to as "BIFS data". However, it should be understood by those of ordinary skill in the art that the binary data may be referred to by other terms other than "BIFS data", such as "VRML binary data," for example. Additional embodiments are equally available.

Figure 2:
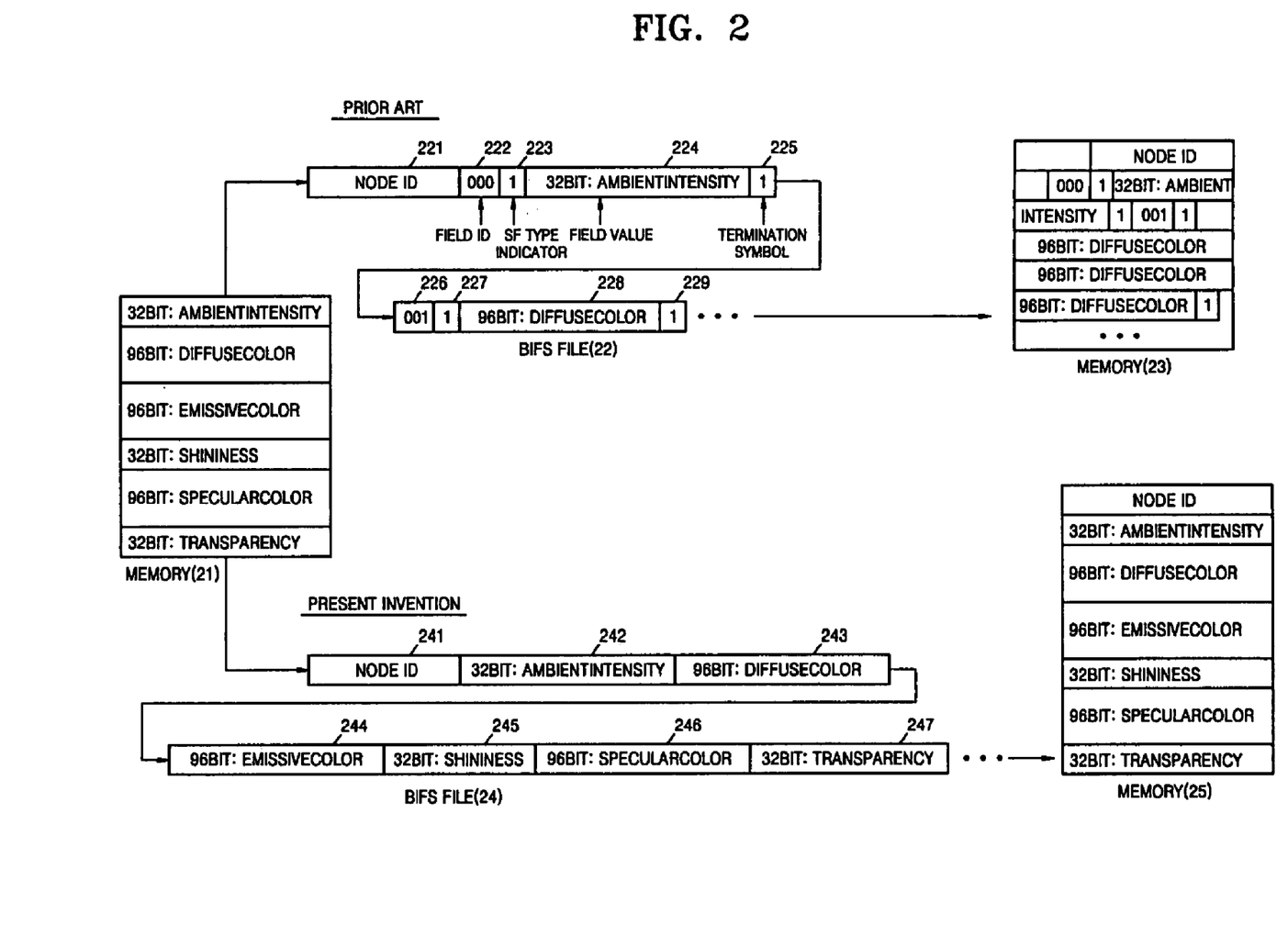
FIG. 2 illustrates a conventional storing of BIFS (Binary Format for Scenes) data and a storing of BIFS data according to an embodiment of the present invention.

FIG. 2 illustrates a conventional storing of BIFS (Binary Format for Scenes) data and a storing of BIFS data according to an embodiment of the present invention.

Referring to FIG. 2, the conventional MPEG-4 encoding system converts the BIFS data stored in the memory 11 into the format of a BIFS file 22. According to MPEG-4 standards, BIFS data is binary data used to describe a content of a scene, and includes a plurality of nodes. Further, according to VRML standards, each node is an element used to describe a scene, and there may be various nodes for describing a shape, a light source, and a material making up an object. The node may include fields, which define attributes of the node, and an event, which is a message transmitted from one node to another node. Here, each node has a set of fixed fields.

Hereinafter, a material node will now be described, as only an example. As such an example, the material node may have the following set of fields:

```
Material {
    SFFloat ambientIntensity
    SFColor diffuseColor
    SFColor emissiveColor
    SFFloat shininess
    SFColor specularColor
    SFFloat transparency
}
```

For such a material node, the conventional MPEG-4 encoding system converts BIFS data stored in a memory 21 to the format of a BIFS file 22 to include a node ID 221, a field ID 222, a single field type indicator 223, a field value 224, and a termination symbol 225, in that order. A value of 1, for the termination symbol 225, indicates that the BIFS data has not yet terminated and another field ID 226, a single field type indicator 227, a field value 228, and a termination symbol 229 follow the termination symbol 225. A value of 0 for the termination symbol 225 indicates that the BIFS data has terminated.

The conventional MPEG-4 decoding system stores the BIFS file 22 in a memory 23. As described above, since the conventional MPEG-4 encoding system assigns a unique ID to each field and transmits the BIFS file, the conventional MPEG-4 decoding system can identify fields included in the BIFS file 22 using field IDs. Therefore, the order of the fields is not important, and fields which are not used or have a default value can be omitted. The conventional MPEG-4 decoding system then inversely transforms the BIFS data stored in the memory 23 into original BIFS data.

A MPEG-4 encoding system according to an embodiment of the present invention converts the BIFS data stored in the memory 21 into a BIFS file 22 without performing a format conversion process. That is, according to the present embodiment, the MPEG-4 encoding system can convert the BIFS data stored in the memory 21 into the BIFS file 24, which has only a node ID 241 and field values 242~246.

Further, in this MPEG-4 decoding system the binary file 15 can be stored in the memory 16. Since the format of the BIFS data stored in the memory 16 or the MPEG-4 decoding system may be the same as the format of the original BIFS data, unlike in the conventional method, an inverse transformation process is not needed. However, since, unlike in the conventional system, a field ID may not be assigned to each field, the ordering of data, according to fields, is important.

That is, the MPEG-4 encoding system and the MPEG-4 decoding system should be correspondingly arranged such that the array structure of the BIFS data processed by the MPEG-4 decoding system is the same, e.g., always identical, to the array structure of the BIFS data processed by the MPEG-4 encoding system, for example. The MPEG-4 decoding system may then routinely decode BIFS data according to the array structure of the BIFS data previously arranged by the MPEG-4 encoding system and the MPEG-4 encoding system. Accordingly, the conventional inverse transforming process, which required a copying operation, can be skipped, and therefore, the corresponding need of excess memory and power can be avoided and the decoding process can be performed at a high speed.

Figure 3:
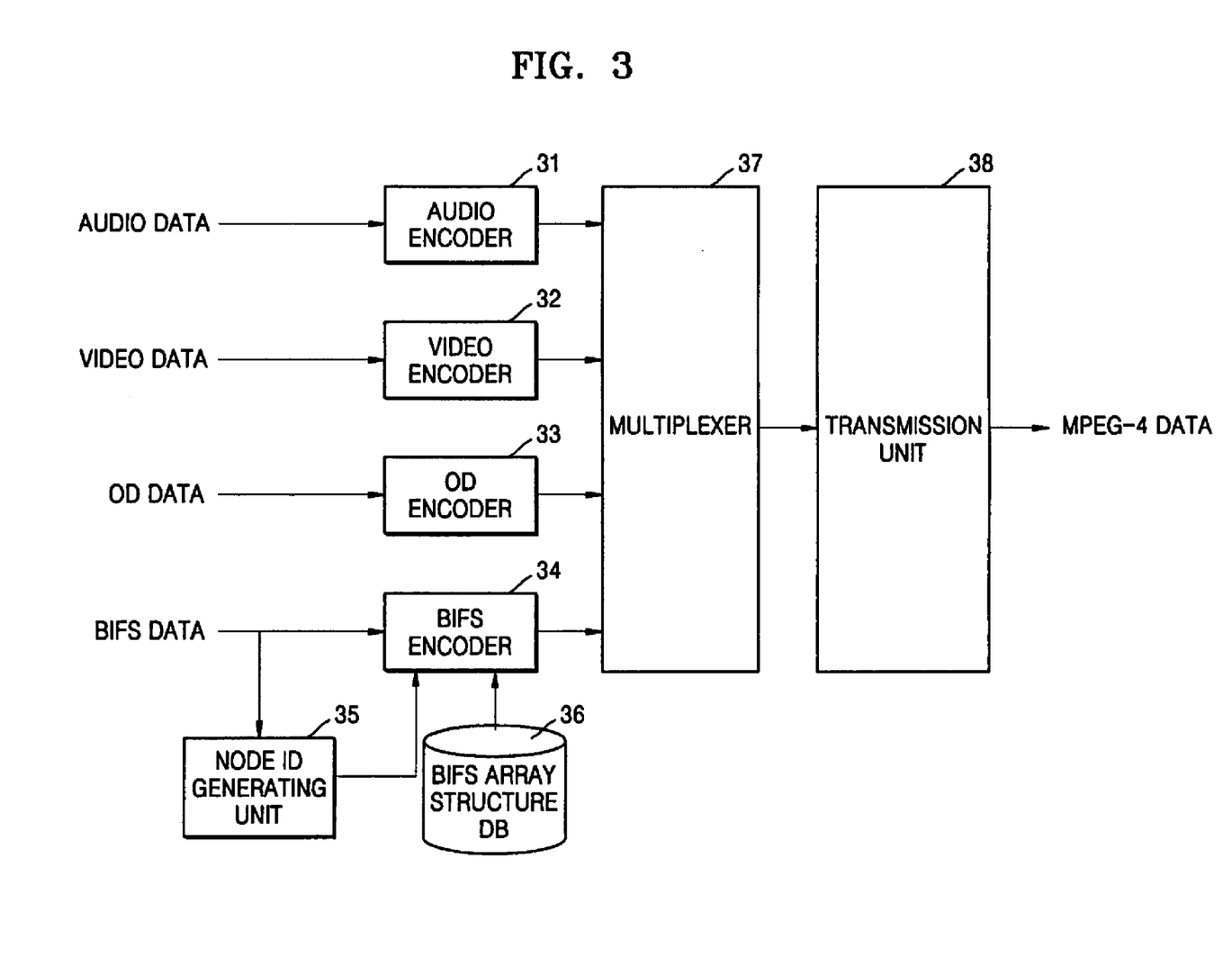
FIG. 3 illustrates an MPEG-4 encoding system, according to an embodiment of the present invention.

FIG. 3 illustrates an MPEG-4 encoding system, according to an embodiment of the present invention.

Referring to FIG. 3, the MPEG-4 encoding system, according to this embodiment, may include an audio encoder 31, a video encoder 32, an OD (object descriptor) encoder 33, a BIFS encoder 34, a node ID generating unit 35, a BIFS array structure database 36, a multiplexer 37, and a transmission unit 38.

The audio encoder 31, the video encoder 32, and the OD encoder 33 may encode audio data, video data, and OD data according to MPEG-4 standards, respectively, for example.

The node ID generating unit 35 may generate a node ID for identifying the array structure of BIFS data stored in the aforementioned memory 21. More specifically, the node ID generating unit 35 may generate a node ID for identifying the array structure of a set of fields that define attributes of a node. That is, conventionally, a node ID is used to identify a node, while, according to an embodiment of the present invention, the node ID may be used to identify the array structure of a set of fields defining the attributes of a node.

The BIFS encoder 34 may encode BIFS data according to a BIFS data array structure, which corresponds to the node ID generated by the node ID generating unit 32. More specifically, the BIFS encoder 34 may encode BIFS data stored in the memory 21 according to a BIFS data array structure, corresponding to the node ID generated by the node ID generating unit 35, among a plurality of BIFS data array structures stored in the BIFS array structure database 36.

Figure 4:
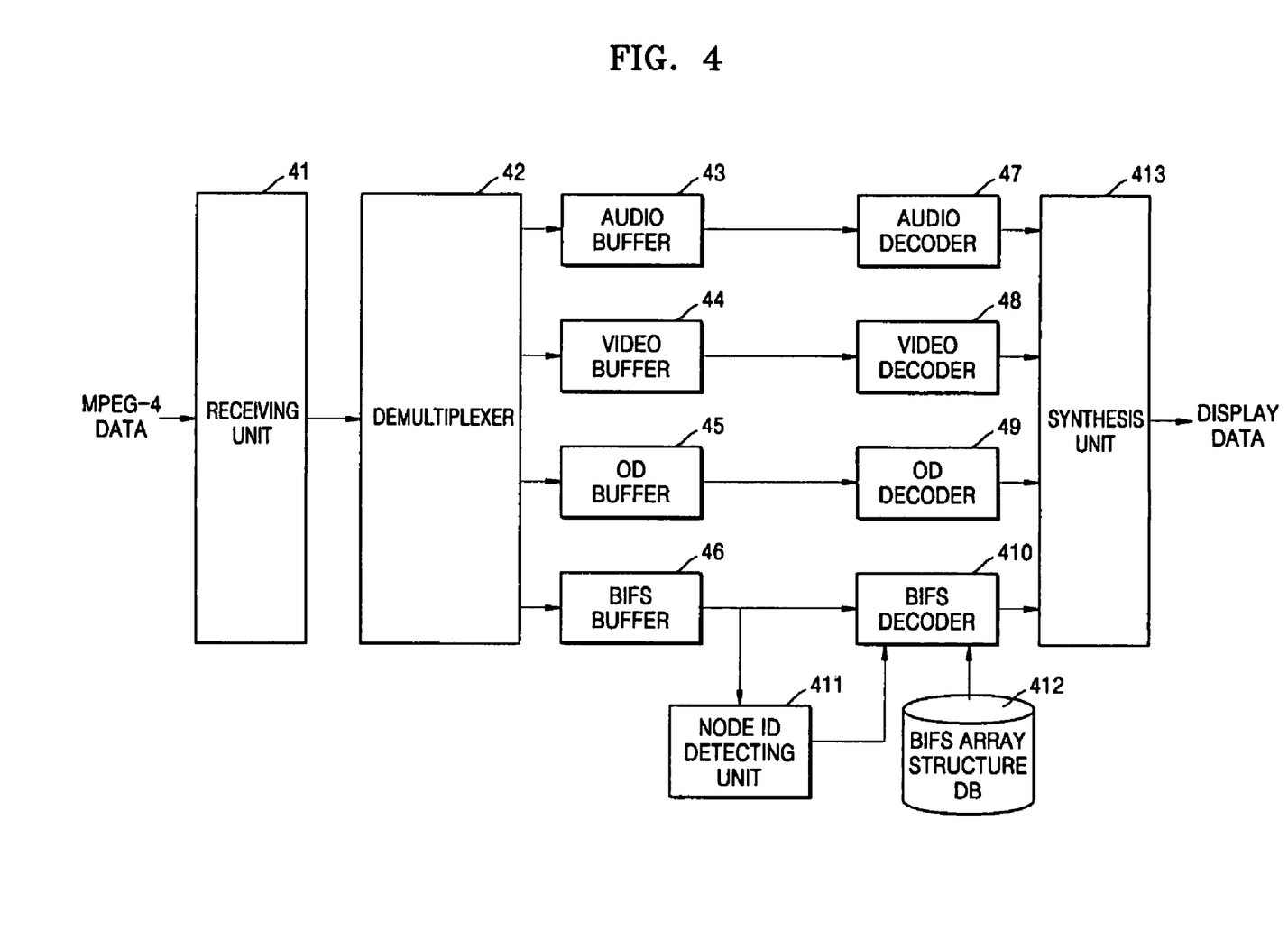
FIG. 4 illustrates an MPEG-4 decoding system, according to an embodiment of the present invention.

However, the BIFS data array structure should be the same as the BIFS data array structure to be used in the decoding process, according to an embodiment of the present invention. That is, the BIFS array structure database 36 of the MPEG-4 encoding system and a BIFS array structure database 412 of the MPEG-4 decoding system should be the same. To this end, here, the BIFS array structure database 36 of the MPEG-4 encoding system may store array structures of BIFS data, which are the same as the array structures of BIFS data used by the MPEG-4 decoding system. In addition to that described above, the encoding system may encode data according to the MPEG-4 standards.

Referring to FIG. 2 as an example, the BIFS encoder 34 may directly convert, 32-bit ambientIntensity, 96-bit diffuseColor, 96-bit emissiveColor, 32-bit shininess, 96-bit specularColor, and 32-bit transparency, which are BIFS data stored in the memory 21, into a BIFS file including a node ID 241, 32-bit ambientIntensity 242, 96-bit diffuseColor 243, 96-bit emissiveColor 244, 32-bit shininess 245, 96-bit specularColor 246, and 32-bit transparency 247, without performing a format conversion.

The multiplexer 37 may multiplex data encoded by the audio encoder 31, the video encoder 32, the OD encoder 33, and the BIFS encoder 34, for example. The transmission unit 38 may then transmit, for example, the data multiplexed by the multiplexer 37, i.e., MPEG-4 data in a binary file form including data encoded according to the BIFS data array structure stored in the BIFS array structure database 36, from the MPEG-4 decoding system via a communication path, e.g., such as through the Internet, noting that alternative embodiments are equally available.

FIG. 4 illustrates an MPEG-4 decoding system, according to an embodiment of the present invention.

Referring to FIG. 4, the MPEG-4 decoding system according to this embodiment may include a receiving unit 41, a demultiplexer 42, an audio buffer 43, a video buffer 44, an OD buffer 45, a BIFS buffer 46, an audio decoder 47, a video decoder 48, an OD decoder 49, a BIFS decoder 410, a node ID detecting unit 411, a BIFS array structure database 412, and a synthesis unit 413, for example.

The receiving unit 41 may receive MPEG-4 data from the MPEG-4 encoding system via a communication path, e.g., the Internet. Particularly, the receiving unit 41 receives BIFS data in a binary file form including data encoded according to the BIFS data array structure that is stored in the BIFS array structure database 412. The demultiplexer 41 may demultiplex the MPEG-4 data received by the receiving unit 41 to extract audio data, video data, OD data, and BIFS data from the MPEG-4 data.

The audio buffer 43, the video buffer 44, the OD buffer 45, and the BIFS buffer 46 may temporarily store the audio data, the video data, OD data, and the BIFS data extracted by the demultiplexer 42, respectively.

The audio decoder 47 may decode the audio data stored in the audio buffer 43 according to MPEG-4 standards, the video decoder 48 may decode the video data stored in the video buffer 44 according to MPEG-4 standards, and the OD decoder 49 may decode the OD data stored in the OD buffer 45 according to MPEG-4 standards.

The node ID detecting unit 411 may detect a node ID identifying the array structure of the BIFS data stored in the aforementioned memory 25. More specifically, the node ID detecting unit 411 may detect a node ID identifying an array structure of a set of fields that define attributes of a node. That is, conventionally, the node ID was used to identify a node, while, according to an embodiment of the present invention, the node ID is used to identify the array structure of a set of fields that define attributes of a node.

The BIFS decoder 410 may decode the BIFS data based on the node ID detected by the node ID detecting unit 411. More specifically, the BIFS decoder 410 may decode the BIFS data stored in the memory 25 according to a BIFS data array structure, corresponding to the node ID detected by the node ID detecting unit 411, among a plurality of BIFS data array structures stored in the BIFS array structure database 412.

The BIFS data array structure should be the same as the array structure of BIFS data in the encoding process, according to an embodiment of the present invention. That is, here, the BIFS array structure database 36 of the MPEG-4 encoding system and the BIFS array structure database 412 of the MPEG-4 decoding system should be the same. To this end, the BIFS array structure database 412 of the MPEG-4 decoding system may store the array structure used by the MPEG-4 encoding system to encode the BIFS data. In addition to that described above, the decoding system may decode data according to MPEG-4 standards, except a portion proposed by the present embodiment.

Referring to FIG. 2 as an example, the BIFS decoder 410 may decode the node ID, 32-bit ambientIntensity, 96-bit diffuseColor, 96-bit emissiveColor, 32-bit shininess, 96-bit specularColor, and 32-bit transparency, all of which may be stored in the memory 25, without using an inverse transforming process, unlike in the conventional system.

The synthesis unit 413 may synthesize the data decoded by the audio decoder 47, the video decoder 48, the OD decoder 49, and the BIFS decoder 410 to generate display data, for example.

Figure 5:
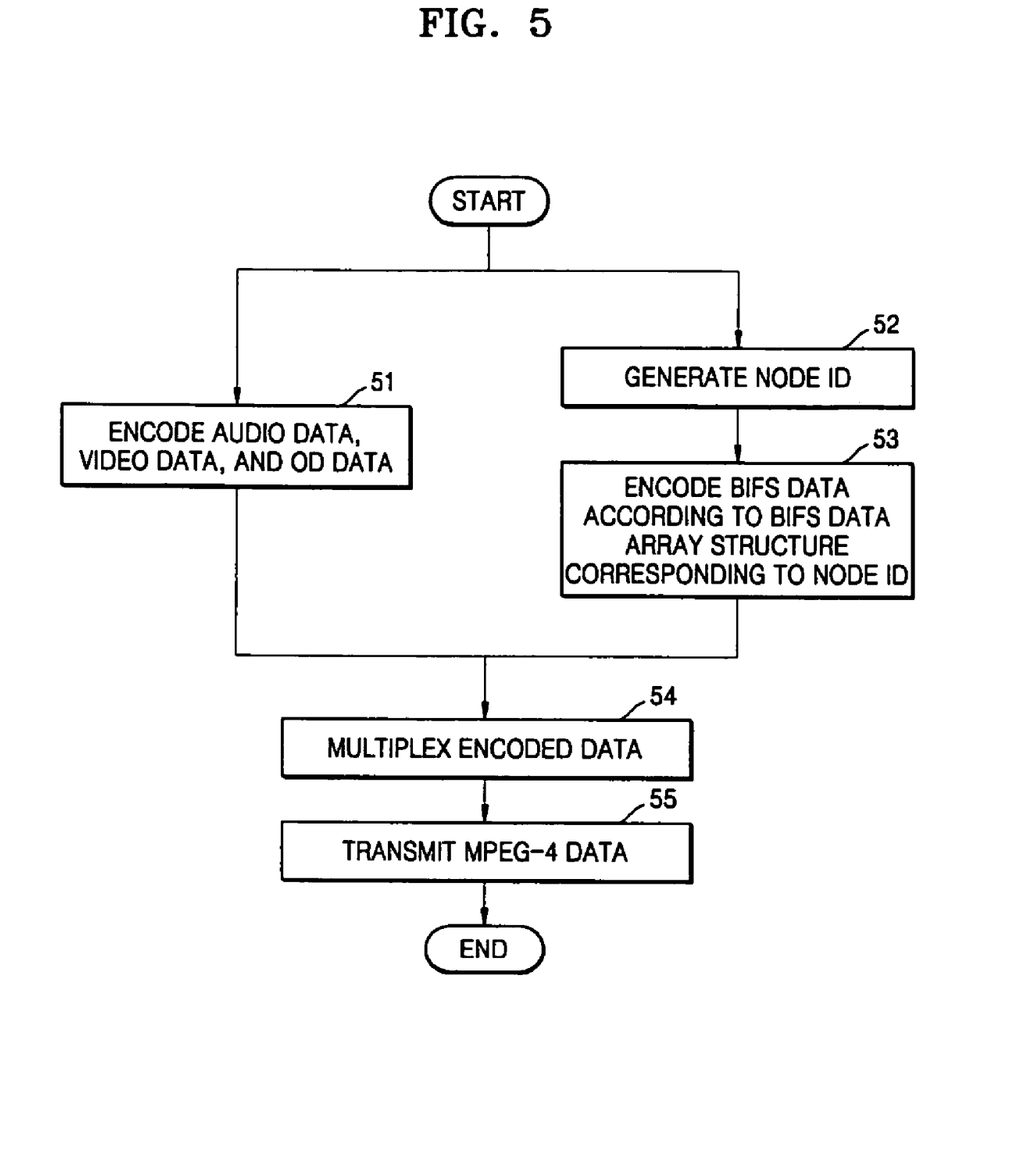
FIG. 5 illustrates an MPEG-4 encoding method, according to an embodiment of the present invention.

FIG. 5 illustrates an MPEG-4 encoding method, according to an embodiment of the present invention.

An MPEG-4 encoding method, according to an embodiment of the present invention, may be performed by the MPEG-4 encoding system illustrated in FIG. 3, for example. Accordingly, the above description related to the MPEG-4 encoding system could be applied to the MPEG-4 encoding method even when corresponding description is omitted in the below discussion.

The MPEG-4 encoding system may encode, in operation 53, audio data, video data, and OD data according to MPEG-4 standards, for example.

The MPEG-4 encoding system may generate, in operation 52, a node ID for identifying an array structure of BIFS data, e.g., stored in the aforementioned memory 21. More specifically, in operation 52, the MPEG-4 encoding system may generate a node ID for identifying the array structure of a set of fields that define attributes of a node.

The MPEG-4 encoding system may encode, in operation 53, BIFS data according to the BIFS data array structure corresponding to the node ID generated in operation 52. More specifically, in operation 53, the MPEG-4 encoding system may encode the BIFS data stored in the memory 21, for example, according to the BIFS data array structure corresponding to the node ID generated in operation 52, among a plurality of BIFS data array structures stored in the BIFS array structure database 36.

The MPEG-4 encoding system may multiplex the data encoded in operation 51 and operation 53, in operation 54.

The MPEG-4 encoding system may then transmit, in operation 55, the data multiplexed in operation 54, e.g., MPEG-4 data in a binary file form which may include the data encoded according to the BIFS data array structure stored in the BIFS array structure database 36, to the MPEG-4 decoding system via a communication path, such as the Internet, for example.

Figure 6:
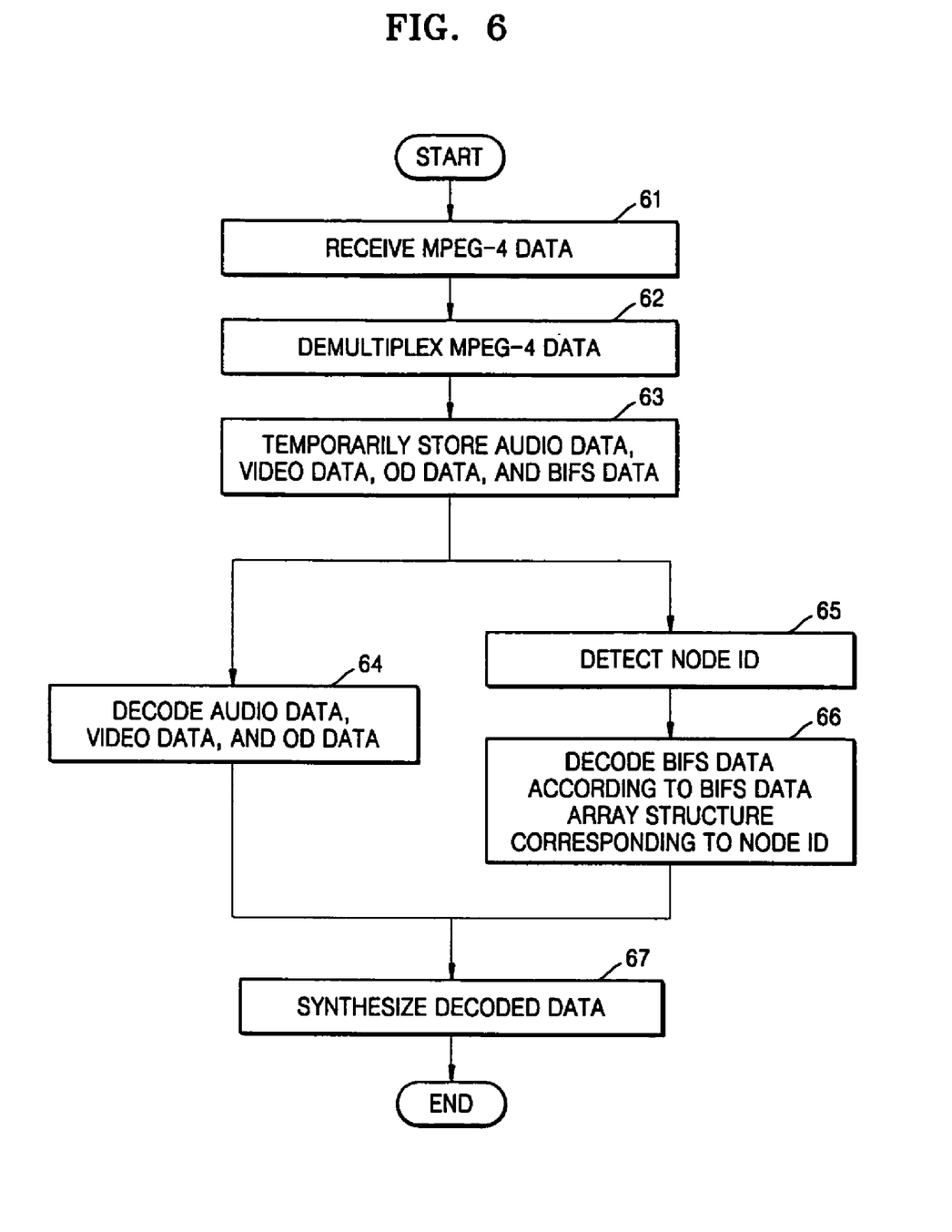
FIG. 6 illustrates an MPEG-4 decoding method, according to an embodiment of the present invention.

FIG. 6 illustrates an MPEG-4 decoding method, according to an embodiment of the present invention.

Here, an MPEG-4 decoding method may be performed by the MPEG-4 decoding system illustrated in FIG. 4, for example. Accordingly, the above description related to the MPEG-4 decoding system could be applied to the MPEG-4 decoding method even when the corresponding description is omitted in the below discussion.

The MPEG-4 decoding system may receive, in operation 61, the MPEG-4 data in a binary file which may include the data encoded according to the BIFS data array structure stored in the BIFS array structure database 412, from the MPEG-4 encoding system, e.g., as illustrated in FIG. 3, via a communication path, such as the Internet, for example.

The MPEG-4 decoding system may demultiplex, in operation 62, the MPEG-4 data received in operation 61 to extract the audio data, the video data, the OD data, and the BIFS data from the MPEG-4 data, for example.

The MPEG-4 decoding system may temporarily store the extracted audio data, video data, OD data, and BIFS data, in operation 63.

The MPEG-4 decoding system may further decode the audio data, video data, and OD data, stored in operation 63, according to MPEG-4 standards, in operation 64.

The MPEG-4 decoding system may detect, in operation 65, a node ID for identifying the array structure of BIFS data stored in the memory 25. More specifically, in operation 65, the MPEG-4 decoding system may detect an ID for identifying the array structure of a set of fields which define attributes of a node.

The MPEG-4 decoding system may decode the BIFS data based on the detected node ID, in operation 66. More specifically, in operation 66, the MPEG-4 decoding system may decode the BIFS data stored in the aforementioned memory 25 according to the BIFS data array structure, corresponding to the node ID detected in operation 66, among a plurality of BIFS data array structures stored in the BIFS array structure database 412.

The MPEG-4 decoding system may further generate display data, in operation 67, by synthesizing data decoded in operations 64 and 66 according to MPEG-4 standards.

Embodiments of the present invention may be implemented through computer readable code, such as computer programs, in general-use digital computers, for example, using a medium, e.g., a computer readable recording medium. Examples of such media may include magnetic storage media (e.g., ROM, floppy disks, hard disks, etc.), optical recording media (e.g., CD-ROMs, or DVDs), and storage media such as carrier waves (e.g., transmission through the Internet), noting that additional embodiments are equally available.

According to an embodiment of the present invention, an MPEG-4 encoding system and an MPEG-4 decoding system may respectively encode and decode BIFS data according to the same BIFS data array structure, and therefore, a conventional process of converting a format into a binary file and an inverse transforming process that requires a copying operation can be avoided, resulting in a reduction of memory and power use.

Particularly, according to an embodiment of the present invention, since a BIFS data array structure may be identified using only a node ID, the additional use of a field ID, a termination symbol, etc., which are required in the above conventional method, are not needed, and thus, encoding and decoding processes can be performed at higher speeds.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A decoding method comprising:
    detecting information for identifying an array structure of a continuous bit string of binary data describing a scene, the detected information identifying an array structure of a set of fields that define attributes to a predetermined node of the scene; and
    decoding the binary data based on the detected information.

2. The decoding method of claim 1, wherein the information is additionally an ID (identification) of the predetermined node among nodes making up the scene.

3. The decoding method of claim 2, wherein the decoding of the binary data comprises decoding the binary data according to the array structure corresponding to the detected ID, among a plurality of array structures stored in a database.

4. The decoding method of claim 1, wherein the array structure and an array structure used in a corresponding encoding method, which generated the binary data, are equivalent.

5. The decoding method of claim 1, wherein the binary data is BIFS (Binary Format for Scene) data based on MPEG (Moving Picture Experts Group)-4 standards based on VRML (Virtual Reality Modeling Language).

6. A decoding system comprising:
    a detecting unit detecting information for identifying an array structure of a continuous bit string of binary data describing a scene, the detected information identifying an array structure of a set of fields that define attributes to a predetermined node of the scene; and
    a decoder decoding the binary data based on the information detected by the detecting unit.

7. The decoding system of claim 6, wherein the information is additionally an ID of the predetermined node among nodes making up the scene.

8. The decoding system of claim 6, wherein the array structure and an array structure used in a corresponding encoding system, which generated the binary data, are equivalent.

9. A medium comprising computer readable code to control at least one computer to implement a decoding method, the method comprising:
    detecting information for identifying an array structure of a continuous bit string of binary data describing a scene, the detected information identifying an array structure of a set of fields that define attributes to a predetermined node of the scene; and
    decoding the binary data based on the detected information.

10. An encoding method comprising:
    generating information for identifying an array structure for a continuous bit string of binary data to describe a scene, the detected information identifying an array structure of a set of fields that define attributes to a predetermined node of the scene; and
    encoding the binary data according to the array structure corresponding to the information,
    wherein the encoding of the binary data includes accompanying the binary data with the information.

11. The encoding method of claim 10, wherein the information is additionally an ID of the predetermined node among nodes making up the scene.

12. The encoding method of claim 11, wherein the encoding of the binary data comprises encoding the binary data according to the array structure corresponding to the information among a plurality of array structures stored in a database.

13. The encoding method of claim 10, wherein the array structure and an array structure used in a corresponding decoding method, for decoding the binary data, are equivalent.

14. The encoding method of claim 10, wherein the binary data is BIFS data based on MPEG-4 standards based on VRML.

15. An encoding system comprising:
    a generating unit to generate information for identifying an array structure for a continuous bit string of binary data to describe a scene, the detected information identifying an array structure of a set of fields that define attributes to a predetermined node of the scene; and
    an encoder to encode the binary data according to the array structure corresponding to the information,
    wherein the encoder accompanies the binary data with the information.

16. The encoding system of claim 15, wherein the information is additionally an ID of the predetermined node among nodes making up the scene.

17. The encoding system of claim 15, wherein the array structure and an array structure used by a corresponding decoding system, for decoding the binary data, are equivalent.

18. A medium comprising computer readable code to control at least one computer to implement an encoding method, the method comprising:
    generating information for identifying an array structure of for a continuous bit stream of binary data to describe a scene, the detected information identifying an array structure of a set of fields that define attributes to a predetermined node of the scene; and encoding the binary data according to the array structure corresponding to the information, wherein the encoding of the binary data includes accompanying the binary data with the information.

19. An encoding method comprising:

generating information for identifying an array structure for a continuous bit string of binary data to describe a scene, the detected information identifying an array structure of a set of fields that define attributes to a predetermined node of the scene; and encoding the binary data according to the array structure corresponding to the information.

20. An encoding system comprising:

a generating unit to generate information for identifying an array structure for a continuous bit string of binary data to describe a scene, the detected information identifying an array structure of a set of fields that define attributes to a predetermined node of the scene; and an encoder to encode the binary data according to the array structure corresponding to the information.

* * * * *